(12) United States Patent
Bennett et al.

(10) Patent No.: US 8,761,193 B2
(45) Date of Patent: Jun. 24, 2014

(54) WIRELESS COMMUNICATION DEVICE CAPABLE OF UTILIZING ADDITIONAL BANDWIDTH

(75) Inventors: James Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 256 days.

(21) Appl. No.: 13/422,290

(22) Filed: Mar. 16, 2012

(65) Prior Publication Data

US 2013/0242762 A1 Sep. 19, 2013

Related U.S. Application Data

(60) Provisional application No. 61/562,196, filed on Nov. 21, 2011.

(51) Int. Cl.
*H04W 16/14* (2009.01)
(52) U.S. Cl.
USPC .......................................... 370/437; 370/445
(58) Field of Classification Search
USPC ................................................. 370/437, 445
See application file for complete search history.

(56) References Cited

U.S. PATENT DOCUMENTS

| 2005/0117670 | A1* | 6/2005 | Webster et al. ............... 375/330 |
| 2008/0070586 | A1* | 3/2008 | Kermoal et al. ........... 455/452.2 |
| 2011/0116490 | A1* | 5/2011 | Wilhelmsson et al. ....... 370/343 |

* cited by examiner

*Primary Examiner* — Hoon J Chung
(74) *Attorney, Agent, or Firm* — Sterne, Kessler, Goldstein & Fox P.L.L.C.

(57) ABSTRACT

A wireless communication device is disclosed that is capable of utilizing bandwidth outside of its allocated bandwidth in order to maximize frequency coverage. The allocated band is separate from a neighboring band by a guard band. The device performs a scan of the neighboring band in order to determine an activity level within the neighboring band. Based on the determined activity level, the device expands its communication frequency range to include the guard band and/or the neighboring band. Once expanded, the device periodically rescans the neighboring band in order to determine whether the device must contract its frequency band out of the expanded area. The device can also receive activity level information of the neighboring band from a server via a common network infrastructure, and can coordinate expansion with other devices.

20 Claims, 8 Drawing Sheets

Fig. 2

| BS Tx Power (dBm) | 100 (kHz) | 200 (kHz) | 250 (kHz) | 400 (kHz) | ≥600 <1200 (kHz) | ≥1200 <1800 (kHz) | ≥1800 <6000 (kHz) | ≥6000 (kHz) |
|---|---|---|---|---|---|---|---|---|
| ≥43 | +0.5 | -30 | -33 | -60 | -70 | -73 | -75 | -80 |
| 41 | +0.5 | -30 | -33 | -60 | -68 | -71 | -73 | -80 |
| 39 | +0.5 | -30 | -33 | -60 | -66 | -69 | -71 | -80 |
| 37 | +0.5 | -30 | -33 | -60 | -64 | -67 | -69 | -80 |
| 35 | +0.5 | -30 | -33 | -60 | -62 | -65 | -67 | -80 |
| ≤33 | +0.5 | -30 | -33 | -60 | -60 | -63 | -65 | -80 |

Exemplary Spectrum Mask

PRIOR ART

WIRELESS COMMUNICATION DEVICE CAPABLE OF UTILIZING ADDITIONAL BANDWIDTH

CROSS REFERENCE TO RELATED APPLICATIONS

This application claims the benefit of U.S. Provisional Application No. 61/562,196, filed Nov. 21, 2011.

FIELD OF DISCLOSURE

The disclosure relates to wireless communications, and more specifically to a wireless communication device that is capable of capturing unused or underused portions of the available frequency spectrum.

BACKGROUND

Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls. Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency modulated signal with encoded information. This radio frequency is transmitted into a wireless environment and is received by a second wireless communication device. The second wireless communication device demodulates and decodes the received signal to obtain the information. The second wireless communication device can then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

The increasing popularity of wireless communications means that more devices should be serviced. However, there is only a limited band of available radio frequencies (approximately 9 kHz-300 GHz) that can be allocated for radio communication. In addition, nearly all of the available radio frequency band is already allocated to other radio technologies and/or uses (e.g., satellite, maritime, and weather device communications). Therefore, the demand for radio frequency bands continues to significantly grow, while the supply continues to shrink.

Because of the lack of available bandwidth, frequency bands are sold piecemeal to highest bidders. As a result, a single wireless application (e.g., mobile telephone communication) can have several small frequency bands allocated for its use that are separated from each other by frequency bands allocated to other technologies.

FIG. 1 illustrates a partial spectral band allocation of a frequency spectrum within the United States. As shown in FIG. 1, the illustrated portion of the spectral plan includes frequencies ranging from approximately 1,710 MHz to 1,880 MHz, and includes several portions allocated to different technologies, including a METSAT Weather Satellite portion 102, and GSM (Global System for Mobile Communication) and LTE (Long-Term Evolution) UL (uplink) portion 104, Radio Microphones portion 106, Flex Use Study portion 108, GSM/LTE DL (downlink) portion 110, and DECT (Digital Enhanced Cordless Telecommunications) portion 112. As discussed above, GSM/LTE communications, for example, typically use portion 104 and portion 110, which are separated from each other by other technology portions.

To even further complicate matters, to avoid interference between neighboring bands, each allocated frequency band is separated from neighboring allocated frequency bands by a guard band (i.e., a band of frequencies designated for non-use). Therefore, the lines separating each of the adjacent portions shown in FIG. 1 represent edge guard bands. These guard bands should be sufficiently wide so as to prevent cross-communication between neighboring frequency bands, and therefore can consume a significant portion of the frequency band. In addition to edge guard bands that separate distinct wireless technology bands (e.g., the METSAT Weather Satellite portion 102 from the GSM/LTE UL portion 104), internal guard bands are also used within a wireless technology to prevent interference between communication channels (when the technology includes channelization, unless an alternative method, such as OFDM is used to prevent channel interference).

The characteristics of a guard band are dictated by a spectral mask, which defines the signal powers that should be met for various frequencies. FIG. 2 illustrates an exemplary spectrum mask. As shown in FIG. 2, various power levels (in dB) are defined for numerous different frequency ranges, depending on transmission power. These power levels are satisfied from devices transmitting within the adjacent bands through the use of bandpass filters.

To further illustrate how significant portions of bandwidth are unusable in conventional communication systems, FIG. 3 illustrates an exemplary frequency band scheme currently employed for IEEE 802.11a communications. As shown in FIG. 3, an allocated portion of the frequency band is divided between an LTE carrier 330 and Dual CDMA carriers 320. Although the allocation 300 includes 20 MHz of bandwidth (allowing for 64 312.4 kHz sub-carrier separation), 3.75 MHz is used for guard bands between channels (equivalent to 12 subcarriers*312.4 kHz). In addition, the allocation 300 includes edge guard bands 311 and 312 that are each approximately 625 kHz wide. As a result of these guard bands, approximately 5 MHz of the allocated 20 MHz (~25%) is unusable.

Although it can be possible to reduce the size of the guard bands, doing so requires extremely complex filters for quickly reducing signal strengths in the guard band. In other words, in order to shrink the size of edge guard bands, spectrum masks will become increasingly strict, requiring significantly more expensive filters. Consequently, reducing the size of edge guard bands becomes impractical for most applications.

Currently, band plans instituted by various countries to manage their many competing wireless technologies does not allow for any overlap among those technologies. As such, each technology is required to communicate only within its designated band. However, in any given area of a particular region, very few of the several technologies will ever be in full operation, leaving several regions of the available frequency band under-utilized.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

FIG. 2 illustrates an exemplary spectrum mask;

Figure 7:
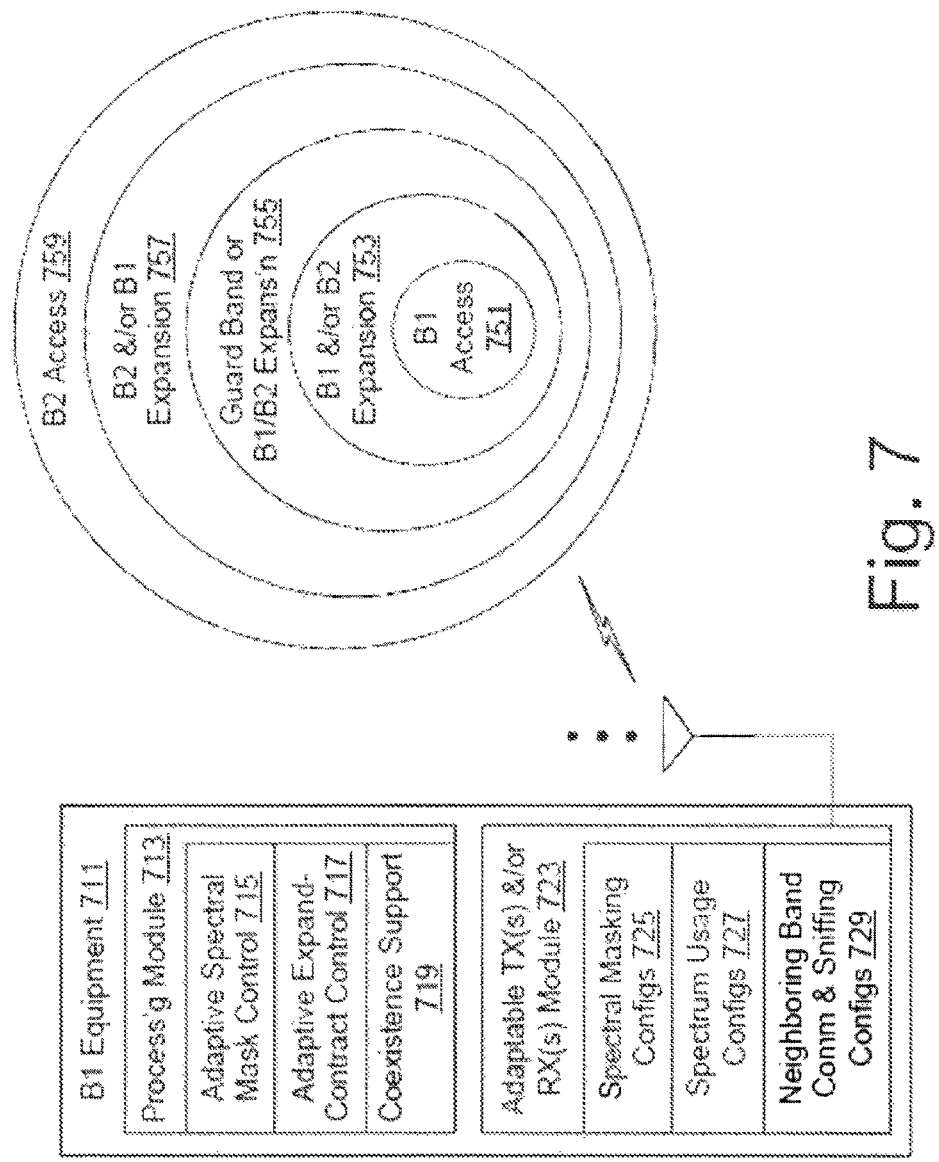
Figure 8:
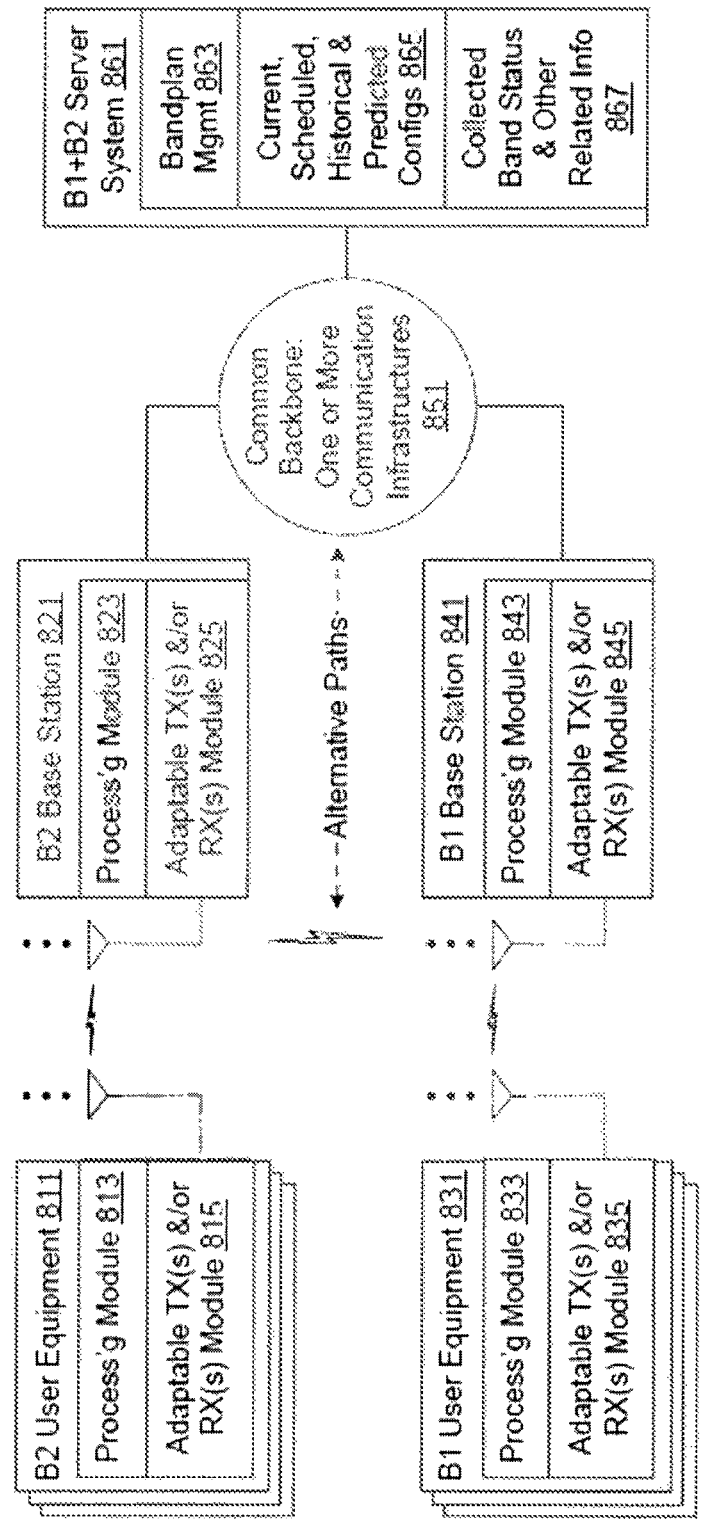

FIG. 7 illustrates a second wireless communication environment according to an exemplary embodiment of the present disclosure; and FIG. 8 illustrates various modes of operation of various devices within the second wireless communication environment that can be used to classify activity of various portions of frequency spectrum of the second wireless communication environment according to an exemplary embodiment of the present disclosure.

Embodiments will now be described with reference to the accompanying drawings.

DETAILED DESCRIPTION

The following Detailed Description refers to accompanying drawings to illustrate exemplary embodiments. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic hi connection with other exemplary embodiments whether or not explicitly described.

The exemplary embodiments described herein are provided for illustrative purposes, and are not limiting. Other embodiments are possible, and modifications can be made to the exemplary embodiments within the spirit and scope of the present disclosure. Therefore, the Detailed Description is not meant to be limiting. Rather, the scope of the present disclosure is defined only in accordance with the following claims and their equivalents.

Embodiments can be implemented in hardware (e.g., circuits), firmware, software, or any combination thereof. Embodiments can also be implemented as instructions stored on a machine-readable medium, which can be read and executed by one or more processors. A machine-readable medium can include any mechanism for storing information in a form readable by a machine (e.g., a computing device). For example, a machine-readable medium can include read only memory (ROM); random access memory (RAM); magnetic disk storage media; optical storage media; flash memory devices. Further, firmware, software, routines, instructions can be described herein as performing certain actions. However, it should be appreciated that such descriptions are merely for convenience and that such actions in fact results from computing devices, processors, controllers, or other devices executing the firmware, software, routines, instructions, etc.

For purposes of this discussion, each of the various components discussed can be considered a module, and the term "module" shall be understood to include at least one of software, firmware, and hardware (such as one or more circuit, microchip, or device, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The following Detailed Description of the exemplary embodiments will so fully reveal their general nature that others can, by applying knowledge of those skilled in relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the embodiments is to be described in terms of wireless communication (specifically cellular communication), those skilled in the relevant art(s) will recognize that the embodiments can be applicable to other communications that use wired or other wireless communication methods without departing from the spirit and scope of the present disclosure.

An Exemplary Communication Scheme

Figure 1:
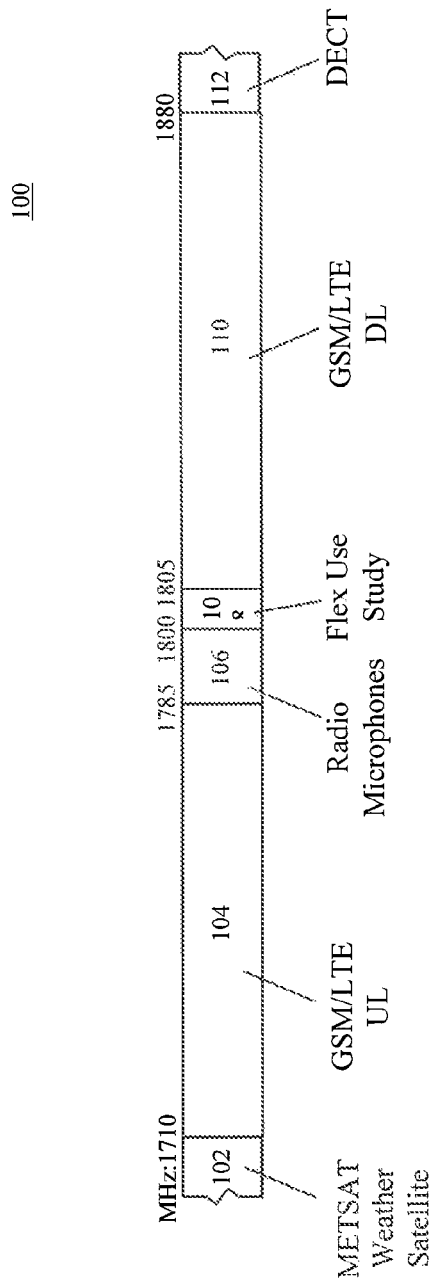
FIG. 1 illustrates an example band allocation within a given frequency band.
Figure 3:
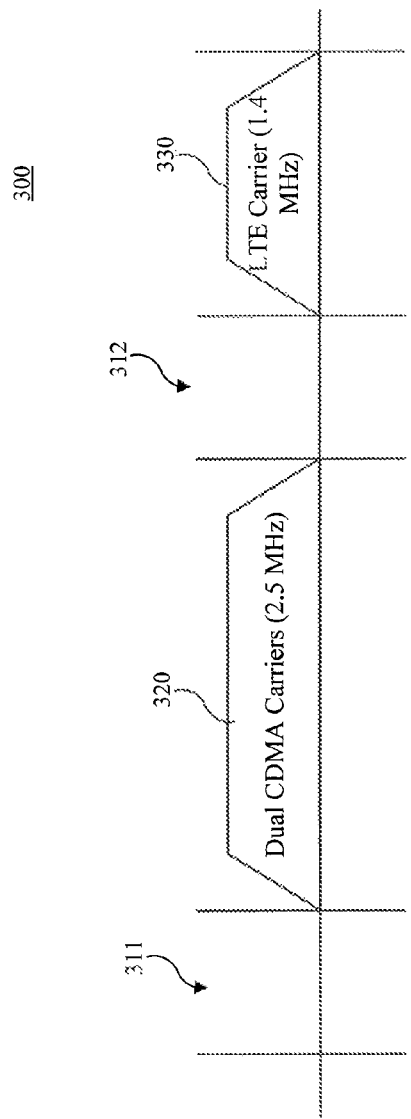
FIG. 3 illustrates a block diagram of an exemplary wireless communication environment.
Figure 4:
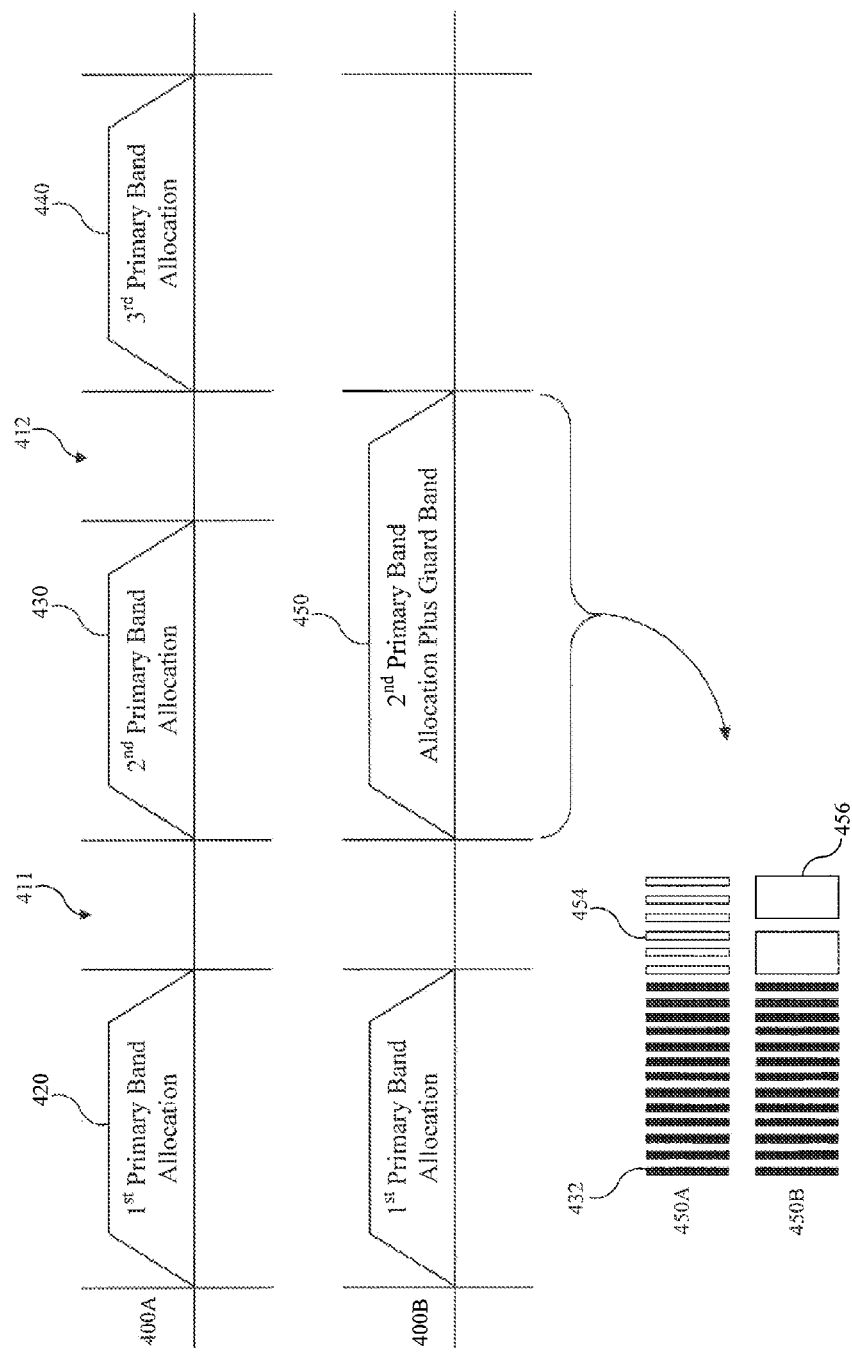
FIG. 4 illustrates a diagram of exemplary frequency band scheme that can be implemented by a wireless communication device.

FIG. 4 illustrates a diagram of exemplary frequency band schemes that can be implemented by a wireless communication device according to an embodiment. As shown in FIG. 4, a first frequency band scheme 400A includes a first primary band allocation 420, a second primary band allocation 430, and a third primary band allocation 440. The first primary band 420, the second primary band allocation 430, and the third primary band allocation 440 represent unique allocations of frequency spectrum that are allocated for specific purposes by a governing authority, such as the Federal Communications Commission (FCC) or any other like governing authority. Typically, at least two of the first primary band allocation 420, the second primary band allocation 430, and the third primary band allocation 440 operate in accordance with different protocol definitions. These different protocol definitions set forth various requirements and objectives for various aspects of various forms of communication among various wired and/or wireless devices. Additionally, the first primary band 420, the second primary band allocation 430, and the third primary band allocation 440 can be utilized by (allocated for use to) one or more wireless technologies.

In some embodiments, one of these different protocol definitions may slowly expand and/or contract from a middle-primary-band frequency band allocation starting point based upon loading. The expansion and/or contraction may occur in neighboring band allocations that may be characterized as being allocated to portions of the frequency spectrum that are less than and/or greater than the middle-primary-band frequency band allocation starting point. The different protocol definitions may expand and/or contract from the middle-primary-band frequency band allocation starting point to/from the neighboring band allocations or may expand and/or contract from another starting point, such as a starting point closest to one of the neighboring band allocations, namely an allocated primary band edge, to provide an example. Whether middling or at the allocated primary band edge, the expansion and contraction via channel allocations and reservation, based on load demands, will tend to minimize neighboring band interference while creating an environment that supports neighboring band expansion and contraction.

Typically, the governing authority reserves portions of the frequency spectrum, referred to as guard bands, between the first primary band allocation 420 and the second primary band allocation 430 and between the second primary band allocation 430 and the third primary band allocation 440 to prevent interference between neighboring primary and allocations. For example, a guard band 411 separates the first primary band allocation 420 from the second primary band allocation 430, and a guard band 412 separates the second primary band allocation 430 from the third primary band allocation 440. The guard band 411 and the guard band 412 represent relatively narrow frequency ranges, when compared to the band allocations 420 through 440, which are used to separate neighboring primary band allocations to ensure that both primary band allocations have the capability to transmit simultaneously without interference.

Conventionally, the wireless communication device communicates with other communication devices using one of the primary band allocations, such as the second primary band allocation 430 to provide an example, from among the first frequency band scheme 400A. However, one or more of neighboring primary band allocations, or portions thereof, such as the first primary band allocation 420 or the third primary band allocation 440, can be unutilized or being under-utilized. For example, one or more of the neighboring primary band allocations can be completely free of communications signals within its allocated frequency spectrum, also referred to as being unutilized. As another example, and more commonly, one or more of the neighboring primary band allocations can include communications signals in some portions of its allocated frequency spectrum, but not others, also referred to as being under-utilized.

In this situation, the wireless communication device can expand its primary band allocation to include neighboring primary band allocations, or portions thereof, and/or guard bands, or portions thereof, adjacent thereto when these neighboring primary band allocations, or portions thereof, are unutilized or under-utilized. Herein, the neighboring primary band allocations or neighboring primary band allocations represent portions of the frequency spectrum that are adjacent to a primary band allocation. These portions of the frequency spectrum can be directly adjacent to the primary band allocation and can be separated by a guard band or can be adjacent to the primary band allocation and can be separated by other portions of the frequency spectrum and can be separated by one or more guard bands. Herein, both of these situations are simply referred to as being adjacent for convenience.

The wireless communication device examines the frequency spectrum, or portions thereof, allocated to one or more neighboring primary band allocations for example, the third primary band allocation 440, to determine an activity level, namely utilized, unutilized, or under-utilized, within these neighboring primary band allocations Often, it can not be necessary to examine the entire frequency spectrum allocation of the one or more neighboring primary band allocations. For example, when the third primary band allocation 440 is channelized (e.g., transmits on a plurality of sub-channels within the frequency allocation), the wireless communication device need only examine the first channel within the third primary band allocation 440.

The activity level within the one or more neighboring primary band allocations, for example, the third primary band allocation 440, can be examined based on RSSI (Received Signal Strength Indication), or using any other signal metric, such as a mean, an average, an instantaneous, a root mean square, a mean power, an average power, an instantaneous power, a root mean square power, and/or any other suitable signal metric of the one or more neighboring primary band allocations that will be apparent to those skilled in the relevant art(s) without departing from the spirit and scope of the present disclosure. Alternatively, the activity level within the one or more neighboring primary band allocations can be examined by activity decoding communications within the one or more neighboring primary band allocations. The utilization of the one or more neighboring primary band can then be made by comparing the measured activity level to one or more predetermined thresholds. If it is determined that the third primary band allocation 440 is being utilized, the wireless communication device operates in accordance with the frequency band scheme 400A. In other words, the wireless communication device communicates primarily in the second primary band allocation 430 only, and maintains the guard band 412. If, on the other hand, it is determined that the third primary band allocation 440 is unutilized or under-utilized, the wireless communication device operates in accordance with the frequency band scheme 400B.

After determining the third primary band allocation 440, or portions thereof, is unutilized or under-utilized, the wireless communication device can expand its band allocation from the second primary band allocation 430 to include the guard band 412 to form the second primary band allocation plus guard band 450. However this illustration is not limiting, those skilled in the relevant art(s) will recognize that the second primary band allocation 430 can be expanded to include at least some of the guard band 412 and/or the third primary band allocation 440, or portions thereof, when it is determined that the third primary band allocation 440, or portions thereof, are unutilized or under-utilized without departing from the spirit and scope of the present disclosure.

Generally, the one or more neighboring primary band allocations and/or guard bands adjacent thereto can be allocated for use by the wireless communication device in multiple different ways. As shown in channel configuration 450A, the various parameters used by the wireless communication device in the second primary band allocation 430 are simply used in one or more neighboring primary band allocations and/or guard bands adjacent thereto. For example, if the wireless communication device communicates using channelization of the second primary band allocation 430, communications can be extended into the guard band 412 by simply extending this channelization currently employed in the second primary band allocation 430, as shown in the channel configuration 450A. The channel configuration 450A includes a plurality of original sub-carrier channels 432, represented by a plurality of black bars. Within the newly-allocated bandwidth, the wireless communication device can simply add additional sub-carrier channels 454, represented by the white bars, that operate substantially the same as the original sub-carrier channels 432.

However, as shown in channel configuration 450B, the various parameters used by the wireless communication device in the second primary band allocation 430 need not to be used in one or more neighboring primary band allocations and/or guard bands adjacent thereto. As another example, the frequencies within the guard band 412 do not necessarily need to be treated the same as the frequencies within the second primary band allocation 430. Therefore, the wireless communication device could instead extend into the guard band 412 using an entirely different scheme than that used in the second primary band allocation 430, as shown in the channel configuration 450B. As the channel configuration 450B depicts, rather than simply extending the sub-carrier channels, the wireless communication device can instead determine a new communication method for use within the guard band 412. For example, the guard band 412 can be used as a supplemental channel, or a control channel, among others.

Adaptive Guard Band Reallocation

As discussed above, the neighboring primary band allocations can be characterized as having different additional activity levels than simply utilized or unutilized. For example, the third primary band allocation 440 can be characterized as being underutilized, namely the third primary band allocation 440 is only used occasionally or with only a small amount of traffic, such as being utilized at certain times, on certain days, and/or has particularly light traffic periods. In this case, the wireless communication device can operate within the guard band 412, coordinated with the activity level of the third primary band allocation 440, and share the guard band 412 with other communication devices depending on activity. As such, the wireless communication device will utilize the guard band 412 during periods of no or light activity, and relinquish the guard band 412 during periods of activity within the third primary band allocation 440.

Similarly, an adaptive approach can be employed to select and utilize a given primary band allocation. For example, at power-up, the wireless communication device sniffs the first primary band allocation 420, the second primary band allocation 430, and the third primary band allocation 440. Although the wireless communication device can be particularly interested in the second primary band allocation 430, the sniffing of the band allocations can reveal that the third primary band allocation 440 is not active, and the first primary band allocation 420 is only occasionally used. In this instance, the wireless communication device can extend communications into the guard band 412 in a time domain fashion, as discussed above, in order to avoid interference. Because the third primary band allocation 440 was determined to be unutilized, the wireless communication device can also operate within the guard band 412 and the third primary band allocation 440, or portions thereof. As above, the wireless communication device can treat the additional channels the same as, or different from, the channels within the second primary band allocation 430.

By adopting another form for the channels within the guard band 412 and/or the third primary band allocation 440, other communication devices that can enter, or roam, into the area of the wireless communication device can access the third primary band allocation 440. For example, beacon signals can be included within the third primary band allocation 440 and can be heard by other communication devices attempting to use the third primary band allocation 440.

Mobility

Because wireless communication traffic within a wireless communication system is always changing due to the mobility of wireless communication devices, it is necessary for the wireless communication device communicating outside of its primary allocation to provide access to other devices designated for the additional allocation, when they appear.

When communications of the wireless communication device are additionally extend onto the guard band 412, the technique used to determine the activity level of the third primary band allocation can still be used because only a small amount of interference will be generated, and once activity is detected within the third primary band allocation 440, the wireless communication device can relinquish the guard band 412. However, if the communications of the wireless communication device additionally extend into both the guard band 412 and the third primary band allocation 440 then some alternative process must occur to relinquish those additional bands as mobility changes.

Essentially, there should some way for the wireless communication device to identify a device attempting to communicate within the third primary band allocation 440. As another issue, some binary bands are tied to a base station. If a stationary base station occupies part of a neighboring primary band allocation (e.g., the third primary band allocation 440), then the wireless communication device should know, based on its location, the locations of nearby base stations. Therefore, the wireless communication device should know in advance whether there will be problems communicating within neighboring bands.

In this instance, one option is to rely on a mapping server to identify the locations of the nearby base stations. If the mapping server indicates that a particular region is empty, then the communications of the wireless communication device can extend into the guard band 412 and the third primary band allocation 440 until the location of the wireless communication device falls within range of a base station. As discussed above, this allows for an adaptive approach to expand and to contract bandwidth outside the primary band allocation. In addition, this also provides reduced power consumption because the wireless communication device need not apply a spectral mask, or can apply a less aggressive spectral mask, while communicating within the guard band 412 and/or the third primary band allocation 440.

An Exemplary Wireless Communication Environment

Figure 5:
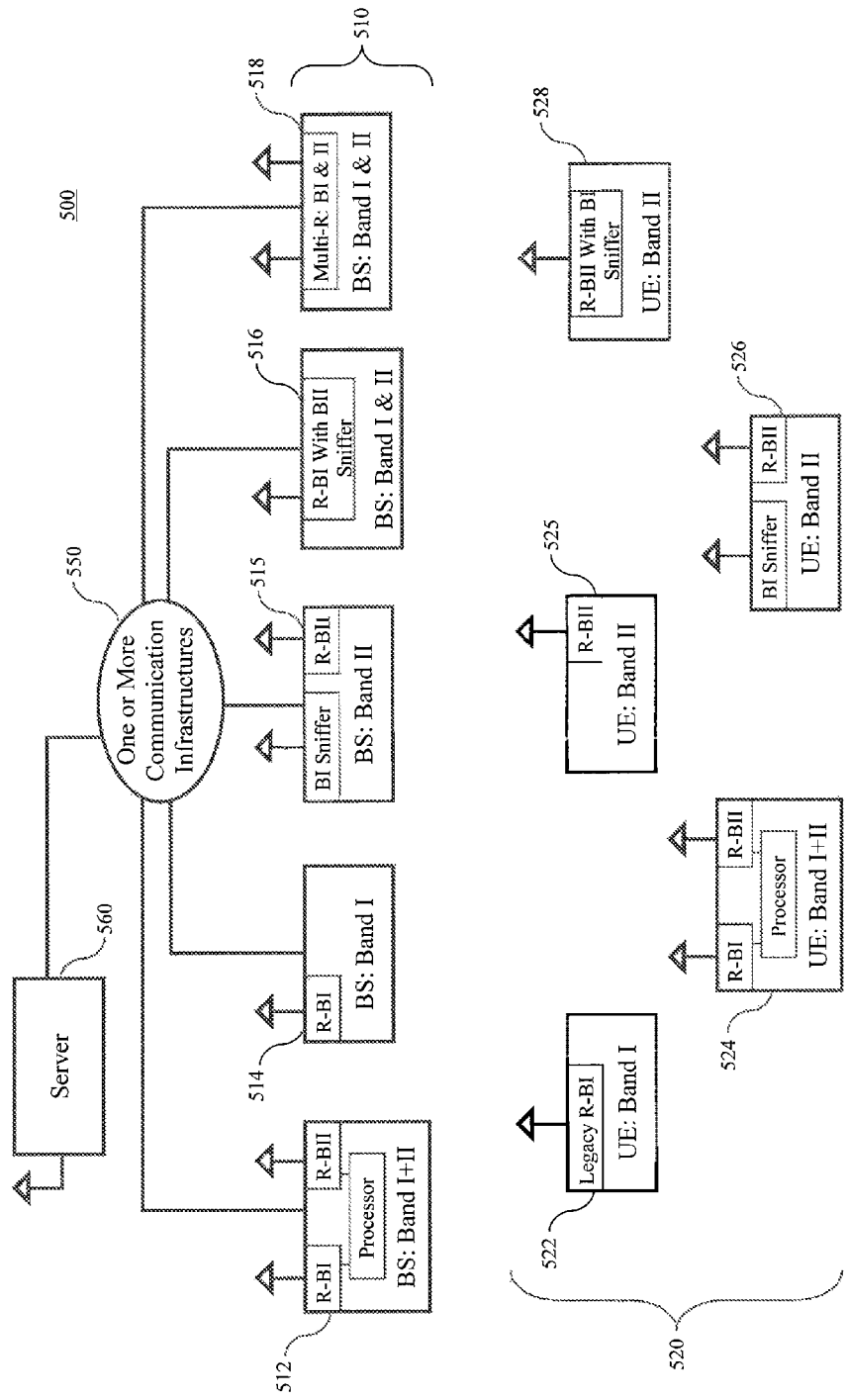
FIG. 5 illustrates a diagram an exemplary frequency band scheme that can be implemented by a wireless communication device.

FIG. 5 illustrates a block diagram of a wireless communication system 500 according to an exemplary embodiment. The system 500 can include one or more base stations 510 and/or one or more user devices 520. For simplicity of discussion, only the capabilities of the wireless communication devices (base stations 510 and user equipment 520) relating to a first frequency band and a second frequency band will be discussed. However, those skilled in the relevant art(s) will recognize that the wireless communication devices can include additional communication capabilities. The system 500 also includes one or more communication infrastructures 550 that constitute a communication backhaul and a possible an optional server 560.

Each of the wireless communication devices (base stations 512-518 and user devices 522-528) within the system 500 has varying communication capabilities. In particular, base station 512 is capable of fully communicating within both the first frequency band (BI) and the second frequency band (BII) and includes a processor capable of coordinating communications between the two frequency bands; base station 514 is only capable of communicating within the first frequency band; base station 515 is capable of fully communicating in the second frequency band and also includes a band I sniffer capable of detecting activity within the first frequency band; base station 516 is capable of communicating within the first frequency band and also includes a band II sniffer capable of detecting activity within the second frequency band; and base station 518 includes a combined/shared radio capable of communicating in both the first frequency band and the second frequency band. Similarly, user device 522 is capable only of legacy communication (e.g., outdated or phased-out communication) within the first frequency band; user device 524 is capable of fully communicating within both the first frequency band (BI) and the second frequency band (BII) and includes a processor capable of coordinating communications between the two frequency bands; user device 525 is capable of communicating only within the second frequency band; user device 526 is capable of communicating within the second frequency band, and is also capable of sniffing the first frequency band to detect activity levels within the first frequency band; and user device 528 includes a combined/shared band radio for communicating in the second frequency band and band I sniffer for detecting activity within the first frequency band.

FIG. 5 provides an example of why a wireless communication device can be required to sniff and/or retrieve neighboring or overlapping cell territories. At any given location within the system 500, there can be one or more base stations 510 and/or user devices 520 that are active on a particular band allocation. Therefore, it is necessary to determine whether a band is active, and how active.

The server 560 can be connected to the one or more network infrastructures 550, and can be tasked with managing the locations and activity of the various base stations 510 and/or user devices 520 within the system 500. For example, the server can acquire and store device capabilities, device locations, device ranges, channel conditions of various frequency bands, as well as any other information that can be pertinent within the spirit and scope of the present disclosure. It should be understood that the functions performed by the server 560 can alternatively be performed by one or more of the wireless communication devices within the system 500.

Using the server 560, a wireless communication device within the system could coordinate the use of guard bands and/or additional frequency bands.

An example of band usage by the wireless communication devices within the system 500 will now be provided. The user device 522 represents a legacy device, whose capabilities do not extend beyond the boundaries of the legacy band. In other words, the user device 522 is not capable of extending and/or contracting its band allocation beyond that of the legacy band. Therefore, the user device 522 is unconcerned with activity levels within neighboring bands.

As another example, the user device 525 primarily operates in band II, but is capable of operating within adjacent guard bands and adjacent frequency bands. However, because the user device 525 only includes a band II receiver, the user device 525 must acquire the activity information of those neighboring bands in some other fashion than through direct detection.

One way for the user device 525 to acquire the activity information is to receive it directly from a base station 510. This information can be received in a half-duplex or full-duplex manner, depending on application. In this manner, the base station 510 listens to neighboring frequency bands. The base station 510 can then periodically transmit activity signals to the user device 525, informing it of the activity levels within those neighboring bands. This listening process can be performed with a band I sniffer, for example.

When, based on the reported activity level, the user device 525 determines to additionally allocate the guard band and/or neighboring band, the user device 525 can choose to do so in multiple ways. For example, the user device 525 can allocate the acquired bandwidth for solely uplink or solely downlink purposes, or can communicated within the acquired bandwidth in a half-duplex or full-duplex manner.

A second way for the user device 525 to obtain the activity level information is from the server 560. As discussed above, the server 560 can be placed within the system 500 and tasked with performing several different functions, such as monitoring activity level within the various frequency bands. The server can further be equipped with wireless communication so as to communicate these activity levels, based on location or other parameters, to the user device 525.

For example, during communication, the various user devices 520 and/or base stations 510 can be reporting their activity through the server 560 along with their respective GPS addresses. In this manner, the server 500 is able to accurately track activity levels by location.

In addition to being used for reference purposes, the server 560 can also be tasked with actively aiding band expansion decisions within the various wireless communication devices of the system 500. For example, the server 560 can provide expansion instructions to the various wireless communication devices based on the known activity/location information. In this manner, decision-making can be centralized and commonly coordinated to provide an even more robust and adaptable system 500.

Figure 6:
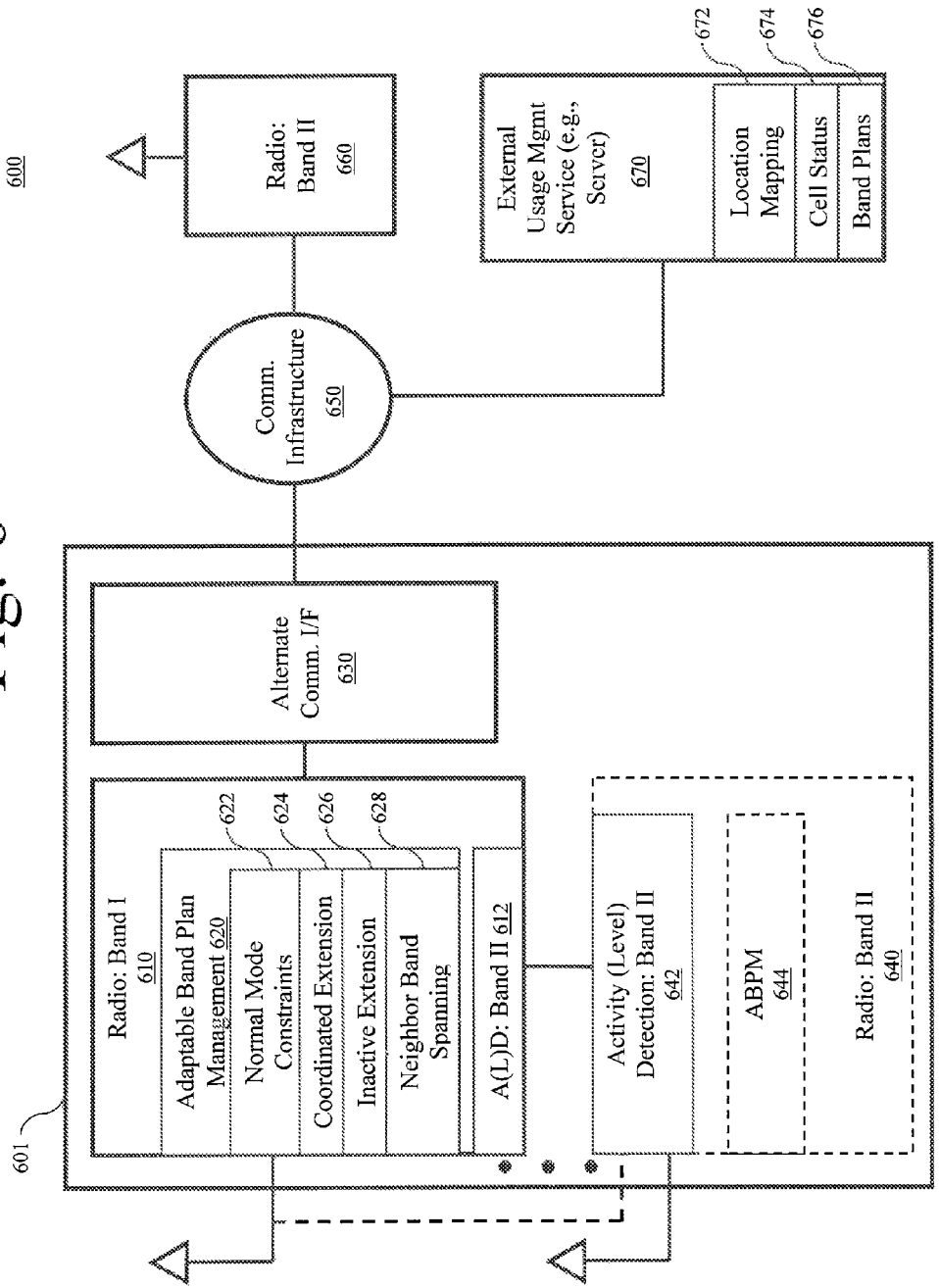
FIG. 6 illustrates a block diagram of an exemplary wireless communication system.

FIG. 6 illustrates a block diagram of a simplified wireless communication network 600. The wireless communication network 600 includes a wireless communication device 601 connected to a communication infrastructure 650. A radio: band II wireless communication device 660 and an external usage management service (e.g., a server) 670 are also connected to the communication infrastructure 650.

The wireless communication device 601 can include multiple radios or an adaptive single radio. For example, the device 601 can include a band I radio 610. The band I radio 610 includes an adaptable band plan management 620 that manages communication frequencies and bandwidths within the wireless communication network 600. The adaptable band plan management 620 includes a normal mode constraints 622 that provides parameters for normal mode operation (operation within the standard primary band allocation) and a coordinated extension 624 that coordinates communication extensions into guard bands and/or neighboring space.

It should be noted that neighboring space can relatively inactive. For example, some technologies become outdated and are no longer used, and the bands previously allocated for those technologies will become very underutilized. Consequently, a capable device could gain a certain amount of that bandwidth and maintain support for old technologies. Also, as discussed above, this neighboring space can be reserved for a technology that rarely uses the space (e.g., perhaps it is reserved for weather updates, which only occur every five minutes)—the coordinated extension 624 could coordinate around this intermittent usage of the neighboring space.

The adaptable band plan management 620 also includes an inactive extension 626 that causes the radio to adapt to conditions of non-usage within the neighboring spaces and a neighbor band spanning 628 that can be used to detect activity within nearby bands and/or to adjust the radio to operate within those neighboring bands.

The band I radio 610 also includes a band II activity (level) detection 612 that tunes to neighboring spaces in order to detect whether the neighboring space is active, and/or how active the neighboring space can be. This would constitute an RSSI approach to determining activity.

The wireless communication device 601 can optionally include a band II radio 640. The band II radio 640 can include an adaptable band plan management 644 that can have substantially the same structure as the adaptable band plan management 620. The band II radio 640 can also include a band II activity (level) detection 642 that assists or cooperates with the band II activity (level) detection 642 of the band I radio 610.

Another way to detect activity is through an alternate communication interface 630. The band I radio 610 is connected to an alternate communication interface 630, which is preferably a back bone connection, and can be used to determine activity within other bands through its connection to the communication infrastructure 650. The alternate communication interface 630 can be either a wired or a wireless connection.

The communication infrastructure 650 can be in a privately-owned network or internet, etc. and merges into a backhaul. Also connected to the communication infrastructure 650 are other wireless communication devices, such as the radio: band II wireless communication device 660, as well as the external usage management service (e.g., server) 670.

The server 670 can include one or more servers. The server 670 can include a cell status 774 tasked with collecting cell status, band plans 776 tasked with generating band layouts and usage based on locations, and a location mapping 772 tasked with creating a general mapping of various regions to provide information to devices based on their respective locations. This information can then be made available to the wireless communication device 601 through the communication infrastructure 650.

Facilitating Green Behavior

The server 670 can also be used to facilitate green behavior within the wireless communication environment 600. Green behavior can be characterized as including a governing authority, such as the Federal Communications Commission (FCC) or any other like governing authority, surrounding an often heavily utilized band allocation, also referred to as a middling band allocation, with typically under-utilized or unutilized neighboring primary band allocations. In this situation, the governing authority can liberally allocate frequency spectrum to middling band allocation under normal activity and the expansion and/or the contracting of the middling band allocation allows for sufficient bandwidth for maximum activity.

The wireless communication device 601 can function as a base station that serves multiple user devices, as well as small/femto cells, etc. Current protocols require those small cells to repeatedly ping the base station 601 to alert the base station 601 as to their presence. This requires that the base station 601 remain active at all times—even when not being used by any devices—and therefore is extremely power-wasteful. Accordingly, the server can be utilized to allow the base station 601 to power down during periods of inactivity.

As an example, say a user device exists within the wireless communication environment 600 that is capable of operating within multiple bands and can perform additional allocations, as discussed above. One problem is that what can be desired for an additional allocation can not always be adjacent to a current operational band. Accordingly, part of the decision regarding which base station with which to connect can depend on the band sought for an additional allocation.

Presume that the device prefers a double-primary allocation, with a second priority of being switched to a non-neighboring band having higher bandwidth, but at higher cost. Finally, as a third Choice, the device prefers to return to the double-allocation territory and performing only a single additional allocation of a guard band. These are all availabilities from a adaptive approach facilitated by the server 670.

Additionally, while the base station 601 is inactive, it can be powered down. When the device determines, based on information received from the server 670 (presumably through a base station to which the device is currently connected), that it wishes to transfer communications to a band better serviced by the base station 601, the server 670 can notify the base station 601 accordingly. Once the base station 601 has received the notification of the incoming device, the base station 601 can then power-up in order to properly service the device.

Using this approach, inactive base stations can be powered down, and any device within the wireless communication environment 600 can query any other device within the wireless communication environment 600. As a result, devices are able to coordinate communications with each other so as to amicably share space within a given band. For example, a device can query another to determine if it will use a particular band, or to request that usage within a particular band halt so as to allow for its own communication.

By coordinating with other devices, a first device can be able to use more of neighboring space more often. Then, when the use of that neighboring space is no longer acceptable to the other devices, those devices can inform the first device to turn off communication within that space.

To provide an example, say the first device has smartly allocated channels that are not near the guard band, so as to allow for use of the guard band by neighboring devices. However, the first device anticipates a higher load, and therefore informs other devices to back out of the guard band and allocates channels closer thereto. In this manner, the devices coordinate with one another so as to utilize the guard band and increase usable bandwidth within the frequency spectrum.

A Second Exemplary Wireless Communication Environment

FIG. 7 illustrates a second wireless communication environment according to an exemplary embodiment of the present disclosure. The second wireless communication environment includes a wireless communication device, denoted as B1 Equipment 711, that is configurable to operate within a a configurable band allocation to communicate with other communication devices within the second wireless communication environment that are not shown in FIG. 7. The B1 Equipment 711 can represent a base station that is typically used to wirelessly communicate with one or more wireless communications devices and/or one or more of the wireless communications devices.

A governing authority, such as the Federal Communications Commission (FCC) or any other like governing authority, uniquely allocates frequency spectrum, also referred to as a band allocation B1, to be used by the B1 Equipment 711. The B1 Equipment 711 can transmit and/or receive various communication signals using the band allocation B1 to/from other communication devices within the second wireless communication environment. The band allocation B1 can be from among multiple band allocations, such as the band allocation B1 and B2 to provide an example, that are allocated by the governing authority. Each of the multiple band allocations can be characterized in accordance with different protocol definitions that set forth various requirements and objectives for various aspects of various forms of communication among various wired and/or wireless devices. For example, the band allocation B1 can be characterized in accordance with a first protocol definition that is different from a second protocol definition that characterizes the band allocation B2. Some of these different protocol definitions can cooperate with one another to allow for use of their band allocation and/or guard bands adjacent thereto. For example, the first protocol definition can cooperate with the second protocol definition to allow the B1 Equipment 711 to expand its band allocation to include the band allocation B2, or portions thereof, and/or guard bands between the band allocation B1 and the band allocation B2 under certain circumstances. As another example, the first protocol definition can cooperate with the second protocol definition to allow the B1 Equipment 711 to contract its band allocation from including the band allocation B2, or portions thereof, and/or guard bands adjacent thereto. In both of these examples, the first protocol definition and the second protocol definition can be assigned various priority ranking that governs the expansion/contraction of their respective band allocations when multiple communications device each request expansion of their band allocation into neighboring primary band allocations and/or their guard bands adjacent thereto.

The governing authority reserves a portion of the band allocation B1 and a portion the band allocation B2 to provide continuous or periodic radio signals with limited information content, also referred to as beacon signals. These radio signals, referred to as B1 Access 751 and B2 Access 759 in FIG. 7, are used to inform communications devices within the second wireless communication environment of the presence of the band allocation B1 and the band allocation B2. The beacon signals can occupy spectrum in any suitable location within the band allocation B1 and the band allocation B2. For example, the beacon signals can occupy portion of the spectrum within the band allocation B1 and/or a portion of the spectrum within the band allocation B2 that are characterized as being in the center of these respective bands when neighboring bands are classified as being utilized. As another example, the beacon signals can occupy a portion of the spectrum within the band allocation B1 and/or a portion of the spectrum within the band allocation B2 that are characterized as being closer to one of the neighboring bands having a greater utilization when both of the neighboring bands are classified as being utilized.

As shown in FIG. 7, a communication device, such as the B1 Equipment 711 to provide an example, can expand its band allocation from the B1 and/or B2 Expansion 753, denoted as B1 and/or B2 Expansion 753, to include a guard band, or a portion thereof, that is adjacent to the B1 and/or B2 Expansion 753, denoted as Guard Band or B1/B2 Expansion 755 in FIG. 7, and/or the B2 and/or B1 Expansion 757, or a portion thereof, denoted as B2 and/or B1 Expansion 757 in FIG. 7. In some situations, the B1 Equipment 711 can expand its band allocation up to the beacon signal, denoted as B2 Access 759 in FIG. 7. Likewise, another communication device within the second wireless communication environment can expand its band allocation from the band allocation B2, denoted as B2 and/or B1 Expansion 757, to include the guard band, or a portion thereof, that is adjacent to the B2 and/or B1 Expansion 757, denoted as Guard Band or B1/B2 Expansion 755 in FIG. 7, and/or the B1 and/or B2 Expansion 753, or a portion thereof, denoted as B1 and/or B2 Expansion 753 in FIG. 7. In some situations, this other communication device can expand its band allocation up to the beacon signal occupying the B1 and/or B2 Expansion 753, denoted as B1 Access 751 in FIG. 7. Additionally, the B1 Equipment 711 can contract its band allocation from including the B2 and/or B1 Expansion 757 and/or the Guard Band or B1/B2 Expansion 755, when the another communication device requests use of the B2 and/or B1 Expansion 757. Typically, this other communication device gains access of the B2 and/or B1 Expansion 757 through the B2 Access 759.

Additionally, the B1 Equipment 711 can adjust its spectrum mask as it is expanding and/or contracting its band allocation. The B1 Equipment 711 typically utilizes an aggressive spectral mask when the B2 and/or B1 Expansion 757 is being utilized by other communication devices within the second wireless communication environment. This aggressive spectral mask allows the B1 Equipment 711 to effectively use most, if not all of, the B1 and/or B2 Expansion 753 for communication without interfering with communications within the B2 and/or B1 Expansion 757. However, as the utilization of the B2 and/or B1 Expansion 757 changes from being utilized to being either unutilized or under-utilized, the aggressiveness of the spectral mask employed by the B1 Equipment 711 can be reduced or the spectral mask itself can be eliminated. For example, the B1 Equipment 711 can expand its band allocation to include the Guard Band or B1/B2 Expansion 755 and simultaneously reduce the aggressiveness of its spectral mask when the B2 and/or B1 Expansion 757 is classified as being unutilized or under-utilized. As another example, the B1 Equipment 711 can expand its band allocation to include the Guard Band or B1/B2 Expansion 755 and the B2 and/or B1 Expansion 757 as well as maintaining the aggressiveness of its spectral mask when the B2 and/or B1 Expansion 757 is classified as being unutilized or under-utilized. As a further example, the B1 Equipment 711 can expand its band allocation to include the Guard Band or B1/B2 Expansion 755 and the B2 and/or B1 Expansion 757 and simultaneously reducing the aggressiveness of its spectral mask when the B2 and/or B1 Expansion 757 is classified as being unutilized or under-utilized. In this situation, the less aggressive spectral mask means less of the B2 and/or B1 Expansion 757 can be used for communication. The B1 Equipment 711 can likewise increase the aggressiveness of its spectral mask as its band allocation is being contracted from including the B2 and/or B1 Expansion 757 and/or the Guard Band or B1/B2 Expansion 755.

As additionally shown in FIG. 7, the B1 Equipment 711 includes a Processing Module 713 and an Adaptable TX(s) and RX(s) Module 723. The Processing Module 713 and the Adaptable TX(s) and RX(s) Module 723 configure the B1 Equipment 711 to operate in the B1 and/or B2 Expansion 753 and its expansion thereof to include the Guard Band or B1/B2 Expansion 755 and the B2 and/or B1 Expansion 757. Similarly, the Processing Module 713 and the Adaptable TX(s) and RX(s) Module 723 configure the B1 Equipment 711 to operate in the B1 and/or B2 Expansion 753, the Guard Band or B1/B2 Expansion 755 and/or the B2 and/or B1 Expansion 757 and its contraction thereof to include the B1 and/or B2 Expansion 753 and/or the Guard Band or B1/B2 Expansion 755.

The Processing Module 713 manages the overall configuration of the B1 Equipment 711, in particular, the Adaptable TX(s) and RX(s) Module 723 to communicate using the configurable band allocation. In particular, the Processing Module 713 configures the Adaptable TX(s) and RX(s) Module 723 to operate in one or more of the: the B1 and/or B2 Expansion 753, the Guard Band or B1/B2 Expansion 755, the B2 and/or B1 Expansion 757 and may, optionally, configure the spectral mask that is to be used by the Adaptable TX(s) and RX(s) Module 723 while communicating within these various band allocations. The Processing Module 713 includes an Adaptive Spectral Mask Control 715, an Adaptive Expand-Contract Control 717, and/or a Coexistence Support 719.

The Adaptive Spectral Mask Control 715 determines a corresponding spectral mask that is to be used by the Adaptable TX(s) and RX(s) Module 723. As discussed above, a spectral mask reduces interference in neighboring primary band allocations by reducing excessive radiation at frequencies beyond the necessary bandwidth. The reduction, or roll-off, in the radiation outside of a band allocation can be characterized by an aggressiveness of the spectral mask. Those spectral masks that can be characterized as being aggressive have a greater reduction, or a sharper reduction, in the radiation outside of the band allocation when compared to those spectral masks that can be characterized as being less aggressive. The aggressiveness of the spectral mask can determined, in part, based upon the classification of the neighboring primary band allocation, such as the B2 and/or B1 Expansion 757 to provide an example. For example, a more aggressive spectral mask can be employed when the neighboring primary band allocation is classified as being utilized. Whereas, a less aggressive spectral mask, or no spectral mask at all, can be employed when the neighboring primary band allocation is classified as being unutilized or under-utilized. In these situations, the more aggressive spectral mask is required to prevent radiation from the B1 and/or B2 Expansion 753 from interfering with the B2 and/or B1 Expansion 757 when the B2 and/or B1 Expansion 757 is classified as being utilized. However, when the B2 and/or B1 Expansion 757 is classified as being unutilized or under-utilized, interference from the B1 and/or B2 Expansion 753 is less likely to occur thereby allowing a reduction in the aggressiveness of the spectral mask. In some situations, however, the Adaptive Spectral Mask Control 715 can simply use the same spectral mask irrespective of whether the neighboring bands are classified as being utilized, under-utilized, or unutilized.

The Adaptive Expand-Contract Control 717 determines the frequency spectrum, or band allocation, that is to be used by the Adaptable TX(s) and RX(s) Module 723 for communication. The Adaptive Expand-Contract Control 717 can cause the Adaptable TX(s) and RX(s) Module 723 to expand its communications to occupy more frequency spectrum than currently being used. For example, the Adaptive Expand-Contract Control 717 can expand the frequency spectrum being occupied by the Adaptable TX(s) and RX(s) Module 723 from the B1 and/or B2 Expansion 753 to include the Guard Band or B1/B2 Expansion 755, the B2 and/or B1 Expansion 757, and/or portions thereof. Additionally, the Adaptive Expand-Contract Control 717 can cause the Adaptable TX(s) and RX(s) Module 723 contract its communications to occupy less frequency spectrum than currently being used. As another example, the Adaptive Expand-Contract Control 717 can contract the frequency spectrum being occupied by the Adaptable TX(s) and RX(s) Module 723 from including the B1 and/or B2 Expansion 753, the Guard Band or B1/B2 Expansion 755, the B2 and/or B1 Expansion 757, and/or portions thereof to include the B1 and/or B2 Expansion 753, the Guard Band or B1/B2 Expansion 755 and/or portions thereof.

The Coexistence Support 719 receives various requests to expand and/or to contract the frequency spectrum that is currently being occupied by the Adaptable TX(s) and RX(s) Module 723. The Coexistence Support 719 coordinates with the Adaptive Spectral Mask Control 715 and the Adaptive Expand-Contract Control 717 to configure the Adaptable TX(s) and RX(s) Module 723. In addition, to adapting spectral masks and frequency spectrum as discussed above, the Coexistence Support 719 coordinates other aspects of communications from the B1 Equipment 711, such as timing information or frame size to provide some examples, that are to be used as the frequency spectrum expands and/or contracts and/or, optionally, as the spectral mask adapts. Additionally, the Coexistence Support 719 can determine whether neighboring primary band allocations, are utilized, under-utilized, and/or unutilized to determine the expansion and/or the contraction of the frequency spectrum and, optionally, the adaptation of the spectral mask. This aspect of the Coexistence Support 719 is further discussed in FIG. 8. The Coexistence Support 719 can continuous determine whether neighboring primary band allocations, are utilized, under-utilized, and/or unutilized and provide the Adaptive Expand-Contract Control 717 when their activity level to continuously adapt the frequency spectrum, or band allocation, that is to be used by the Adaptable TX(s) and RX(s) Module 723 for communication.

The Adaptable TX(s) and RX(s) Module 723 communicates with various communication devices within the second wireless communication environment using various configuration information from the Processing Module 713. The Adaptable TX(s) and RX(s) Module 723 can be characterized as including various configurable transmitters and/or receivers that are used to communicate with various communication devices within the second wireless communication environment. These configurable transmitters and/or receivers can be configured to expand into and/or contract from various portions of the frequency spectrum, optionally, using various spectral masks in response to commands from the Processing Module 713. The Adaptable TX(s) and RX(s) Module 723 includes Spectral Masking Configuration 725, Spectrum Usage Configurations 727, and Neighboring Band Communication and Sniffing Configuration 729.

The Spectral Masking Configuration 725 configures the various configurable transmitters and/or receivers of the Adaptable TX(s) and RX(s) Module 723 to operate in accordance with the spectral mask as determined by the Adaptive Spectral Mask Control 715.

The Adaptive Expand-Contract Control 717 configures the various configurable transmitters and/or receivers of the Adaptable TX(s) and RX(s) Module 723 to operate in accordance with the frequency spectrum as determined by the Adaptive Spectral Mask Control 715.

The Neighboring Band Communication and Sniffing Configuration 729 determines utilization, whether it be utilized, under-utilized, or unutilized, of one or more neighboring primary band allocations by observing, also referred to as sniffing, activity within these one or more neighboring primary band allocations, or portions thereof. For example, the Neighboring Band Communication and Sniffing Configuration 729 can sniff the B2 and/or B1 Expansion 757, or a portion thereof, to determine Whether the B2 and/or B Expansion 757 is utilized, under-utilized, or unutilized. The Neighboring Band Communication and Sniffing Configuration 729 can provide a received signal strength indicator (RSSI) to indicate the activity within these one or more neighboring primary band allocations to the Coexistence Support 719. In some situations, the Neighboring Band Communication and Sniffing Configuration 729 is optional, the activity within these one or more neighboring primary band allocations can be determined in other manners as to be discussed below in FIG. 8. In other situations, the Neighboring Band Communication and Sniffing Configuration 729 as well as the other manners as to be discussed below in FIG. 8 can concurrently be used to determine the activity within these one or more neighboring primary band allocations.

FIG. 8 illustrates various modes of operation of various devices within the second wireless communication environment that can be used to classify activity of various portions of frequency spectrum of the second wireless communication environment according to an exemplary embodiment of the present disclosure. Generally, one or more devices within the second wireless communication environment are configurable to operate in a negotiated mode of operation, a non-negotiated mode of operation, and/or any combination of the negotiated mode and non-negotiated modes of operation. In each of these modes of operation, the one or more devices are configured to within a primary band allocation and can expand and/or contract the primary band allocation to include one or more neighboring primary band allocations and/or one or more guard bands attached thereto. In the negotiated mode of operation, the one or more devices actively determine activity within the one or more neighboring primary band allocations, or portions thereof. In this mode of operation, these devices actively observe the one or more neighboring primary band allocations, or portions thereof, to determine the activity. In the non-negotiated mode of operation, the one or more devices passively determine activity within the one or more neighboring primary band allocations, or portions thereof. In this mode of operation, these devices request activity information from other devices within the second wireless communication environment that relates to the activity. In some situations, the one or more devices operate in a combined negotiated mode and non-negotiated mode of operation. In these situations, these devices seek to expand the primary band allocation to expand to include an additional first portion of the frequency spectrum, such as a guard band to provide an example, using the negotiated mode of operation and to further expand beyond the additional first portion of the frequency spectrum to include an additional second portion of the frequency spectrum, such as a neighboring primary band allocation to provide an example, using the non-negotiated mode of operation.

As shown in FIG. 8, the second wireless communication environment can include B2 User Equipment 811, B2 Base Station 821, B1 User Equipment 831, B1 Base Station 841, and B1+B2 Server System 861. The B1 User Equipment 831 represents user equipment, such as a mobile communications device, that is configurable to wirelessly communicate with the B1 Base Station 841 using a first primary band allocation B1. As discussed above, the B1 User Equipment 831 can expand the first primary band allocation B1 to include a second primary band allocation B2, or a portion thereof, and/or guard bands adjacent thereto. The B1 User Equipment 831 and the B1 Base Station 841 include a Processing Module 813 and an Adaptable TX(s) and RX(s) Module 815 and a Processing Module 823 and an Adaptable TX(s) and RX(s) Module 825, respectively, which are configurable to operate in a substantially similar manner as the Processing Module 713 and the Adaptable TX(s) and RX(s) Module 723, respectively. It should be noted that the B1 User Equipment 831 can be one from among multiple B1 User Equipment 831.

Similarly, the B2 User Equipment 811 represents user equipment, such as a mobile communications device, that is configurable to wirelessly communicate with the B2 Base Station 821 using the second primary band allocation B2. As discussed above, the B2 User Equipment 811 can expand the second primary band allocation B2 to include the first primary band allocation B1, or a portion thereof, and/or guard bands adjacent thereto. The B2 User Equipment 811 and the B2 Base Station 821 include a Processing Module 833 and an Adaptable TX(s) and RX(s) Module 835 and a Processing Module 843 and an Adaptable TX(s) and RX(s) Module 845, respectively, which are configurable to operate in a substantially similar manner as the Processing Module 713 and the Adaptable TX(s) and RX(s) Module 723, respectively, using the second primary band allocation B2. It should be noted that the B2 User Equipment 811 can be one from among multiple B2 User Equipment 811.

The B2 Base Station 821 and the B1 Base Station 841 are communicatively coupled to the B1+B2 Server System 861 via a common backbone 851. The common backbone 851 includes one or more wired and/or wireless communication infrastructures to communicatively couple the B1+B2 Server System 861 to the B2 Base Station 821 and/or the B1 Base Station 841.

As discussed above, the B2 User Equipment 811, B2 Base Station 821, B1 User Equipment 831, B1 Base Station 841, and B1+B2 Server System 861 are configurable to operate in the negotiated mode of operation, the non-negotiated mode of operation, or any combination of the negotiated mode and non-negotiated modes of operation to dynamic allocate bandwidth for communication among these devices and can select between each of these modes of operation. Various negotiated modes of operation, non-negotiated modes of operation, or combinations of the negotiated and non-negotiated modes of operation are to be discussed in further detail below. However, those skilled in the relevant art will recognize that other negotiated modes of operation, non-negotiated modes of operation, and or combinations of the negotiated mode and non-negotiated modes of operation are possible without departing from the spirit and scope of the present disclosure.

Non-Negotiated Modes Operation

Mode 1: In this first non-negotiated mode of operation, the B1 User Equipment 831 desires to extend and/or contract its primary band allocation, such as the first primary band allocation B1, to include one or more neighboring primary band allocations, such as the second primary band allocation B2 to provide an example, and/or one or more guard bands adjacent thereto. In this situation, the Adaptable TX(s) and RX(s) Module 835 observes, or sniffs, the one or more neighboring primary band allocations, or portion thereof, for activity. The Adaptable TX(s) and RX(s) Module 835 provides a first command to the B1 Base Station 841 indicating its expansion of its primary band allocation when no activity, namely the one or more neighboring primary band allocations being classified as being unutilized, is observed in the one or more neighboring primary band allocations, or the portions thereof. Afterwards, the B1 User Equipment 831 proceeds to communicate with the B1 Base Station 841 using this expanded band allocation. Upon observing an increase in the activity within the one or more neighboring primary band allocations, namely the one or more neighboring primary band allocations being classified as being utilized or under-utilized, the Adaptable TX(s) and RX(s) Module 835 provides a second command to the B1 Base Station 841 indicating its contraction of its band allocation. For example, the B1 User Equipment 831 can contract its band allocation from including its primary band allocation, the one or more neighboring primary band allocations and the one or more guard bands adjacent thereto to include its primary band allocation and the one or more guard bands. As another example, the B1 User Equipment 831 can contract its band allocation from including its primary band allocation, the one or more neighboring primary band allocations, and the one or more guard bands adjacent thereto to include its primary band allocation. Afterwards, the B1 User Equipment 831 proceeds to communicate with the B1 Base Station 841 using this contracted band allocation.

This contracted band allocation allows for the B2 User Equipment 811 to communicate with the B2 Base Station 821 using the one or more neighboring primary band allocations, such as the second primary band allocation B2 to provide an example, with a possibility of extending its band allocation to the one or more guard bands attached thereto.

Mode 2: In this second non-negotiated mode of operation, the B1 User Equipment 831 desires to extend and/or contract its primary band allocation to include one or more neighboring primary band allocations and/or one or more guard bands adjacent thereto. Unlike the first non-negotiated mode of operation, the B1 Base Station 841 observes, or sniffs, the one or more neighboring primary band allocations, or the portions thereof, for activity using the Adaptable TX(s) and RX(s) Module 845. The B1 User Equipment 831 expands and/or contracts its band allocation as discussed above in response to commands from the B1 Base Station 841.

Mode 3: In this third non-negotiated mode of operation, the B1 Base Station 841 desires to extend and/or contract its primary band allocation to include one or more neighboring primary band allocations and/or one or more guard bands adjacent thereto. In this situation, either the B1 User Equipment 831, as discussed in Mode 1, or the B1 Base Station 841, as discussed in Mode 2, observes, or sniffs, the one or more neighboring primary band allocations, or the portions thereof, for activity. The B1 Base Station 841 expands and/or contracts its band allocation as discussed above in Mode 1 and/or Mode 2.

Negotiated Modes Operation

Mode 4: In this first negotiated mode of operation, the B1 User Equipment 831 desires to extend and/or contract its primary band allocation to include one or more neighboring primary band allocations and/or one or more guard bands adjacent thereto. The B1 Base Station 841 and the B2 Base Station 821 negotiate the extension and/or contraction of the band allocation of the B1 User Equipment 831 as well as spectral masking to be used by the B1 User Equipment 831 using the common backbone 851 and/or a wireless communication link. For example, the B1 Base Station 841 and the B2 Base Station 821 can communicate their corresponding spectral usage, such as being utilized, under-utilized, or unutilized, their corresponding spectral mask configuration to one another. Additionally, the B1 Base Station 841 and the B2 Base Station 821 can negotiate the extension and/or the contraction as well as any spectral masking in accordance with their respective protocol definitions.

Mode 5: In this second negotiated mode of operation, one or more of the B2 User Equipment 811, B2 Base Station 821, B1 User Equipment 831, and the B1 Base Station 841, desire to extend and/or contract their primary band allocations to include one or more neighboring primary band allocations and/or one or more guard bands adjacent thereto, The B1+B2 Server System 861 manages expansion and/or contraction of band allocations as well as spectral masking to be used by each of these devices. As shown in FIG. 8, the B1+B2 Server System 861 includes a Bandplan Management 863, and a Current, Scheduled, Historical & Predicted Configuration 865, and a Collected Band Status and Other Related Information 867 for management of the frequency spectrum of the second wireless communication environment. The Bandplan Management 863 typically relates to information regarding different protocol definitions used within the second wireless communication environment. For example, the different protocol definitions can be assigned various priority rankings that governs the expansion/contraction of their respective band allocations when multiple communications devices from among the second wireless communication environment request expansion of their band allocation into neighboring primary band allocations and/or their guard bands adjacent thereto. The Current, Scheduled, Historical & Predicted Configuration 865 typically relates to information regarding activity within band allocations of the second wireless communication environment. For example, this information can indicate past, present and/or future activity, such as utilized, under-utilized, or unutilized, of one or more of the band allocations, or portions thereof. The Collected Band Status and Other Related Information 867 relates to other information that can be useful in determining activity within band allocations of the second wireless communication environment. For example, this other information can include information collected over a period of time regarding the past, present and/or future activity within the band allocations.

Mode 6: In this third negotiated mode of operation, the functionality of the B1+B2 Server System 861 is split among a first server system to manage expansion, contraction, and/or spectral masking of a first primary band allocation, such as the first primary band allocation B1 to provide an example, and second server system to manage expansion, contraction, and/or spectral masking of a second primary band allocation, such as the second primary band allocation B2 to provide an example.

Mode 7: In this fourth negotiated mode of operation, the B1 User Equipment 831 desires to extend and/or contract its primary band allocation, such as the first primary band allocation B1, to include one or more neighboring primary band allocations, such as the second primary band allocation B2 to provide an example, and/or one or more guard bands adjacent thereto. In this situation, the Adaptable TX(s) and RX(s) Module 835 receives various transmissions over the one or more neighboring primary band allocations which indicate activity within the one or more neighboring primary band allocations. The various transmissions provide information relating to a status of the one or more neighboring primary band allocations, such as spectral usage, masking configuration, past, present and/or future activity to provide some examples. The B1 User Equipment 831 expands and/or contracts its band allocation as discussed above in Mode 1 based upon the activity within the one or more neighboring primary band allocations.

Mode 8: In this fifth negotiated mode of operation, the B1 Base Station 841 desires to extend and/or contract its primary band allocation to include one or more neighboring primary band allocations and/or one or more guard bands adjacent thereto. In this situation, either the B1 User Equipment 831, as discussed in Mode 1, or the B1 Base Station 841, as discussed in Mode 2, receives the various transmissions over the one or more neighboring primary band allocations which indicate the activity within the one or more neighboring primary band allocations. The B1 Base Station 841 expands and/or contracts its band allocation as well as adapting any spectral masking as discussed above in Mode 1 and/or Mode 2 based upon the activity within the one or more neighboring primary band allocations.

Mode 9, in this sixth negotiated mode of operation, the B1 User Equipment 831 and/or the B1 Base Station 841 desire to extend and/or contract their primary band allocation to include one or more neighboring primary band allocations and/or one or more guard bands adjacent thereto. In this situation, the B1 User Equipment 831 and/or the B1 Base Station 841 provide requests to other devices within the second wireless communication environment for the activity of the one or more neighboring primary band allocations. The B1 User Equipment 831 expands and/or contracts its band allocation as well as adapting any spectral masking as discussed above in Mode 1 and/or the B1 Base Station 841 expands and/or contracts its band allocation as well as adapting any spectral masking as discussed above in Mode 2 based upon the activity within the one or more neighboring primary band allocations.

Combined Negotiated and Non-Negotiated Modes Operation

In this first combined negotiated and non-negotiated mode of operation, the B1 User Equipment 831 desires to extend and/or contract its primary band allocation to include one or more neighboring primary band allocations and/or one or more guard bands adjacent thereto. In this situation, the B1 User Equipment 831 extends its band allocation to include the one or more guard bands using any of the non-negotiated modes of operation as well as adapting any spectral masking. The B1 User Equipment 831 extends its band allocation to further the one or more neighboring primary band allocations as well as adapting any spectral masking using any of the negotiated modes of operation.

In this second combined negotiated and non-negotiated mode of operation, the B1 Base Station 841 desires to extend and/or contract its primary band allocation to include one or more neighboring primary band allocations and/or one or more guard bands adjacent thereto. In this situation, the B1 Base Station 841 extends its band allocation to include the one or more guard bands as well as adapting any spectral masking using any of the non-negotiated modes of operation. The B1 Base Station 841 extends its band allocation to further the one or more neighboring primary band allocations as well as adapting any spectral masking using any of the negotiated modes of operation.

CONCLUSION

It is to be appreciated that the Detailed Description, and not the Abstract, is intended to be used to interpret the claims. The Abstract can set forth one or more, but not all exemplary embodiments, and thus, is not intended to limit the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless communication device that is configurable to communicate using a first band allocation, the first band allocation being characterized as being a neighbor of a second band allocation that is different from the first and the second band allocations having a guard band there between, the wireless communication device comprising:
   a processing module configured to determine an activity level within at least a portion of the second band allocation and to expand the first band allocation to include at least a portion of the guard band to form a first band plus guard band allocation when the at least the portion of the second band allocation is not utilized, the first band allocation and the second band allocation being defined and allocate by a governing authority to communicate pursuant to a first protocol definition and a second protocol definition, respectively; and
   an adaptable transmitter and receiver module configured to communicate using the first band plus guard band allocation.

2. The wireless communication device of claim 1, wherein the processing module is further configured to determine a spectral mask to be used by the adaptable transmitter and receiver module when communicating using the first band plus guard band allocation, and
   wherein the adaptable transmitter and receiver module is further configured to communicate using the spectral mask.

3. The wireless communication device of claim 2, wherein the spectral mask is characterized as being less aggressive than a second spectral mask that is used by the adaptable transmitter and receiver module when communicating using the first band allocation.

4. The wireless communication device of claim 1, wherein the processing module is further configured to continuously determine the activity level of the at least the portion of the second band allocation and to contract the first band plus guard band allocation to include the first band allocation when the at least the portion of the second band allocation becomes utilized.

5. The wireless communication device of claim 1, wherein the processing module is further configured to expand the first band allocation to include the guard band and the at least the portion of the second band allocation to form a first band plus second band allocation when the at least the portion of the second band allocation is not utilized, and
   wherein the adaptable transmitter and receiver module is further configured to communicate using the first band plus second band allocation.

6. The wireless communication device of claim 5, wherein the processing module is further configured to continuously determine the activity level of the at least the portion of the second band allocation and to contract the first band plus second band allocation to include the first band plus guard band allocation when the at least the portion of the second band allocation becomes utilized.

7. The wireless communication device of claim 1, wherein the adaptable transmitter and receiver module is further configured to observe the activity level of the at least the portion of the second band allocation.

8. The wireless communication device of claim 1, wherein the processing module is further configured to receive the activity level of the at least the portion of the second band allocation from a second communication device.

9. A communication system that is configurable to communicate using a first band allocation and a second band allocation with a guard band there between, the communication system comprising:
   a first communication device configured to communicate using the first band allocation in accordance with a first protocol definition; and
   a second communication device configured to communicate using the second band allocation in accordance with a second protocol definition that is different from the first protocol definition,
   wherein the first communication device is further configured to negotiate, based upon an activity level within at least a portion of the second band allocation, expansion of the first band allocation to include at least a portion of the guard band to form a first band plus guard band allocation with the second communication device.

10. The communication system of claim 9, wherein the first communication device is further configured to expand the first band allocation when the at least the portion of the second band allocation is not utilized.

11. The communication system of claim 10, wherein the first communication device is further configured to negotiate contraction of the first band plus guard band allocation to include only the first band allocation when the at least the portion of the second band allocation is utilized.

12. The communication system of claim 9, wherein the first communication device is further configured to negotiate the expansion of the first band allocation to include the guard band and the second band allocation to form a first band plus second band allocation.

13. The communication system of claim 12, wherein the first communication device is further configured to expand the first band allocation when the at least the portion of the second band allocation is not utilized.

14. The communication system of claim 13, wherein the first communication device is further configured negotiate contraction of the first band plus second band allocation to include the first band plus guard band allocation when the at least the portion of the second band allocation is utilized.

15. The communication system of claim 11, wherein the first communication device is further configured to adapt a spectral mask to be used when communicating using the first band plus guard band allocation.

16. The communication system of claim 15, wherein the spectral mask is characterized as being less aggressive than a second spectral mask that is used when communicating using the first band allocation.

17. The communication system of claim 9, wherein the first band allocation is characterized as being a neighboring band allocation to the second band allocation.

18. The communication system of claim 9, wherein the first and the second band allocations are defined and allocated by a governing authority to communicate with the first protocol definition and the second protocol definitions, respectively.

19. A wireless communication device that is configurable to communicate using a first band allocation, the first band allocation being characterized as being a neighbor of a second band allocation that is different from the first band allocation, the first and the second band allocations having a guard band there between, the wireless communication device comprising:
 a processing module configured:
  to determine an activity level within at least a portion of the second band allocation, the first band allocation and the second band allocation being defined and allocated by a governing authority to communicate with a first protocol definition and a second protocol definition, respectively, and
  to adapt a spectral mask from being a first spectral mask to a second spectral mask when the at least the portion of the second band allocation is not utilized, the second spectral mask being characterized as being less aggressive than the first spectral mask and including the guard band; and
 an adaptable transmitter and receiver module configured to communicate using the spectral mask.

20. The wireless communication device of claim 19, Wherein the processing module is further configured to expand the first band allocation to include at least a portion of the guard band when the at least the portion of the second band allocation is not utilized; and
 wherein the adaptable transmitter and receiver module is further configured to communicate using the first band allocation and the least the portion of the guard band.

* * * * *

UNITED STATES PATENT AND TRADEMARK OFFICE
CERTIFICATE OF CORRECTION

| | | |
|---|---|---|
| PATENT NO. | : 8,761,193 B2 | Page 1 of 1 |
| APPLICATION NO. | : 13/422290 | |
| DATED | : June 24, 2014 | |
| INVENTOR(S) | : Bennett et al. | |

It is certified that error appears in the above-identified patent and that said Letters Patent is hereby corrected as shown below:

In the Claims:

At column 21, lines 58-59, please replace "different from the first and the second band allocations" with --different from the first band allocation, the first and the second band allocations--.

At column 22, line 1, please replace "allocate" with --allocated--.

At column 23, line 21, please replace "further configured negotiate" with --further configured to negotiate--.

At column 23, line 25, please replace "claim 11" with --claim 9--.

At column 24, line 28, please replace "Wherein" with --wherein--.

At column 24, line 34, please replace "the least the portion" with --the at least the portion--.

Signed and Sealed this
Twenty-third Day of September, 2014

Michelle K. Lee
*Deputy Director of the United States Patent and Trademark Office*